United States Patent [19]
Sasaki et al.

[11] Patent Number: 4,899,702
[45] Date of Patent: Feb. 13, 1990

[54] ALUMINUM ALLOY PISTON AND PISTON-RING ASSEMBLY TREATED TO SUPPRESS AGGLUTINATION OF THE PISTON ALLOY TO A PISTON-RING

[75] Inventors: Norio Sasaki, Nishikamo; Kazuhisa Mayumi, Aichi; Yorishige Maeda, Toyota, all of Japan

[73] Assignee: Toyota Jidosha Kabushiki Kaisha, Japan

[21] Appl. No.: 299,439

[22] Filed: Jan. 23, 1989

[30] Foreign Application Priority Data

Feb. 12, 1988 [JP] Japan .................................. 63-28915

[51] Int. Cl.$^4$ .............................................. F02F 5/00
[52] U.S. Cl. .................. 123/193 P; 92/222; 277/224
[58] Field of Search ............. 123/193 P; 92/222, 223, 92/211; 277/223, 224, 216, 235 A

[56] References Cited

U.S. PATENT DOCUMENTS

| | | | |
|---|---|---|---|
| 4,212,477 | 7/1980 | Ludwig | 277/224 |
| 4,360,956 | 11/1982 | Hiller | 92/222 |
| 4,643,079 | 2/1987 | Brann et al. | 277/224 |
| 4,762,330 | 8/1988 | Lönne et al. | 277/235 A |

FOREIGN PATENT DOCUMENTS

| | | |
|---|---|---|
| 59-81756 | 6/1984 | Japan . |
| 59-184346 | 12/1984 | Japan . |
| 60-82552 | 6/1985 | Japan . |
| 62-137361 | 8/1987 | Japan . |

Primary Examiner—Willis R. Wolfe
Assistant Examiner—M. Macy
Attorney, Agent, or Firm—Kenyon & Kenyon

[57] ABSTRACT

A piston and piston-ring assembly includes a piston and piston-rings located in piston-ring grooves formed in the piston. Such a kind of surface hardening treatment as is accompanied by an increase in surface roughness, such as alumite treatment, is applied to at least a lower groove surface of a top piston-ring groove. On the other hand, a resin with an excellent adhesive property is coated on a portion of a surface of the piston-ring opposing the hardened surface of the piston-ring groove. The heat resistive property of the assembly is improved by the surface hardening treatment without being accompanied by an increase in blowby gas amount and oil consumption because resin removed from the piston ring fills the valleys of the rugged hardened surface of the piston-ring groove.

10 Claims, 4 Drawing Sheets

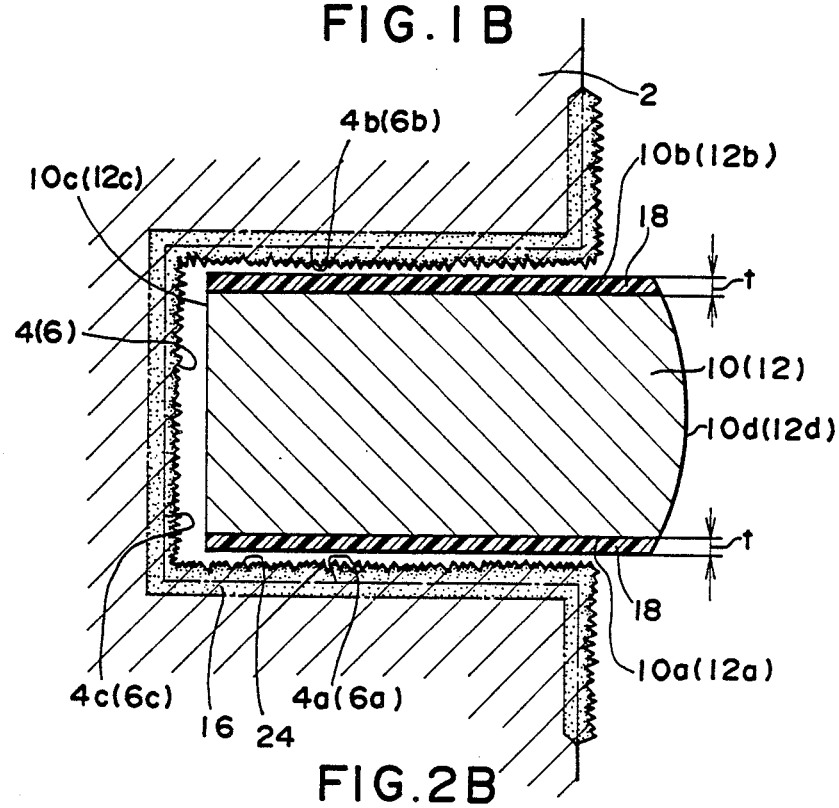
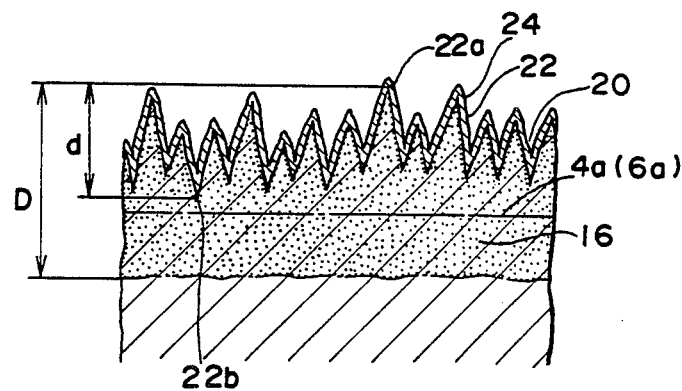

ALUMINUM ALLOY PISTON AND PISTON-RING ASSEMBLY TREATED TO SUPPRESS AGGLUTINATION OF THE PISTON ALLOY TO A PISTON-RING

BACKGROUND OF THE INVENTION

1. Field of the Invention

The present invention relates to a piston and piston-ring assembly. More particularly, the invention relates to a piston and piston-ring assembly where agglutination of aluminum alloy of the piston to a piston-ring is suppressed.

2. Description of Related Art

An assembly of a piston and a piston-ring for use in an internal combustion engine for a vehicle is required to have a heat resistive property. The piston usually comprises an aluminum base alloy for the purpose of making the piston light. When the engine is operated and the temperature of the piston and piston-ring assembly becomes high, the aluminum base alloy of the piston decreases in hardness and tends to agglutinate to the piston-ring, causing the piston-ring to stick to the piston-ring groove. Once the sticking happens, the ability of the piston to follow the cylinder bore surface is reduced, resulting in severe abrasion of the piston-ring and cylinder bore. Further, the severe abrasion will increase the temperature of the piston-ring, especially the temperature of the portion of piston-ring where the circumferential ends of the piston-ring butt together, and may cause a local melting of the piston-ring groove wall. Thus, sticking of the piston-ring to the piston should be prevented.

There are three typical prior art techniques for preventing such a piston-ring sticking. The first is to mold ceramic fibers in a portion of a piston close to a piston-ring groove, as is disclosed in Japanese Utility Model Publication SHO No. 59-81756. The second is to apply surface treatment such as an alumite treatment to a piston-ring groove. The second technique may include the alumite treatment and an ion plating for further forming a titanium nitride layer on the hardened layer obtained through the alumite treatment, as is disclosed in Japanese Utility Model Publication SHO No. 62-137361. The third is to form, on a piston-ring, a coating layer comprising tetrafluoroethylene, which has a good lubricative property and a bad adhesive property, in order to prevent a foreign material including the aluminum alloy of the piston from agglutinating to the piston-ring, as is disclosed in Japanese Utility Model Publication SHO No. 60-82552.

Though not for the purpose of preventing agglutination of the aluminum alloy of a piston to a piston-ring, Japanese Utility Model Publication SHO No. 59-184346 discloses the technique for constructing the oil-ring of polyimide resin for the purpose of improving the lubricative property of the piston-ring.

However, the above-described techniques have the following problems.

When the method of molding ceramic fibers in a piston is used, it is necessary to substitute pressure molding for gravity molding for the purpose of causing the aluminum alloy to soak into the ceramic fibers. This increases the molding cost.

When the method of applying alumite treatment to a surface of a piston-ring groove is used, the surface is roughened by the alumite treatment and the roughened surface will increase the amount of gas and oil passing through clearances formed in the roughened surface to increase the blowby gas amount and the oil consumption.

When the method of forming a coating layer of tetrafluoroethylene on a piston-ring is used, a severe abrasion will happen, once the coating layer is worn off the piston-ring. Thus, the method is less reliable in durability than the method of applying alumite treatment to a surface of a piston-ring groove.

Though the method of constructing an entire ring of polyimide resin can be applied to an oil ring which is exposed to a comparatively low temperature, the method can not be applied to a top piston-ring which is exposed to a high temperature.

SUMMARY OF THE INVENTION

An object of the invention is to provide a piston and piston-ring assembly where agglutination of aluminum alloy of a piston to a piston-ring is greatly suppressed, and thus the heat resistive property and durability of the assembly is greatly improved without being accompanied by an increase in blowby gas amount and oil consumption.

The above-described object can be achieved by a piston and piston-ring assembly for an internal combustion engine in accordance with the present invention. The piston and piston-ring assembly for an internal combustion engine comprises a piston comprising aluminum base alloy and piston-rings fitted in piston-ring grooves formed in the piston. Each of the piston-ring grooves is defined by a groove surface which comprises a groove upper surface, a groove lower surface and a groove side surface connecting the groove upper and lower surfaces, when the piston is vertically orientated. Such a kind of surface hardening treatment as is accompanied by an increase in surface roughness is applied to at least a groove lower surface of at least a top piston-ring groove. Each of the piston-rings includes a ring upper surface, a ring lower surface and a radially inside ring side surface opposing the groove upper surface, the groove lower surface and the groove side surface, respectively, when the piston is vertically orientated. A coating layer including resin having an excellent adhesive property as a base material of the coating layer is formed on at least a surface of a piston-ring opposing the hardened surface of the piston-ring groove. Tetrafluoroethylene should not be included in the resin having an excellent adhesive property.

The groove lower surface of the top piston-ring groove is exposed to severe conditions in heat and load. However, because the surface hardening treatment is applied to at least the groove lower surface of the top piston-ring groove, a portion of the piston close to the groove lower surface of the top piston-ring groove is hardened to form a hardened layer. The hardness of the hardened layer is, for example, $H_k$ 300-450 in Knoop hardness, while the hardness of the non-hardened aluminum base alloy of the piston is less than $H_k$ 200 in Knoop hardness. This hardening of the groove surface effectively prevents agglutination of the aluminum base alloy of the piston to the piston-ring and greatly improves the heat resistive property of the assembly.

The surface hardening treatment comprises, for example, alumite treatment. When the alumite treatment is applied to the groove surface of the piston-ring groove to such an extent that the hardened layer is 10–20 microns in thickness as measured in a direction perpendicular to the groove surface, the rugged surface of the hardened layer will have a roughness of 4–16 microns in distance between a peak and a valley of the rugged surface as measured in the direction perpendicular to the groove surface. Because the valleys of the rugged surface pass blowby gas and oil therethrough and, as a result, will increase blowby gas amount and oil consumption, such valleys should be small in size. Though it might be conceivable to grind the rugged surface of the piston-ring groove, the grinding is not practicable because it is difficult to insert a grinding bit in the piston-ring groove of 1–2 mm in size and because grinding is high in cost as compared with milling.

In accordance with the present invention, the coating layer formed on the piston-ring surface functions to fill the valleys of the rugged surface of the piston-ring groove. More particularly, when the piston is reciprocally moved in the cylinder, the piston-ring moves relative to the piston-ring groove in the circumferential direction of the piston as well as in the axial direction of the piston. Therefore, the piston-ring surface and the rugged surface of the piston-ring groove will be abraded. The coating layer of resin of the piston-ring is gradually worn off the piston-ring and adheres to the piston-ring groove to fill the valleys of the rugged surface of the piston-ring groove, because the resin has an excellent adhesive property. Such a material as polyamide resin or polyimide resin has an excellent adhesive property and well adheres to the rugged surface of the piston-ring groove and is to be included in the material of the coating layer, while tetrafluoroethylene that can not well adhere to any surface should not be included in the material of the coating layer. When the resin having adhered to the rugged surface of the piston-ring groove is pushed by the piston-ring which receives the combustion pressure of the engine, the adhering resin will be deformed so as to fill the valleys of the rugged surface of the piston-ring groove. As a result, passing of air and oil through the valleys of the rugged surface is effectively prevented to suppress an increase in blowby gas amount and oil consumption.

BRIEF DESCRIPTION OF THE DRAWINGS

These and other objects and advantages of the present invention will become apparent from the following detailed description of the present preferred exemplary embodiments of the invention taken in conjunction with the accompanying drawings, in which:

FIG. 1B is a cross-sectional view of a portion of a piston including a piston-ring groove and a piston-ring fitted in the piston-ring groove in accordance with a second embodiment of the present invention.

FIG. 2B is a partial, enlarged cross-sectional view of a surface of the piston-ring groove of FIG. 1B;

DETAILED DESCRIPTION OF THE PREFERRED EMBODIMENTS

Figure 3:
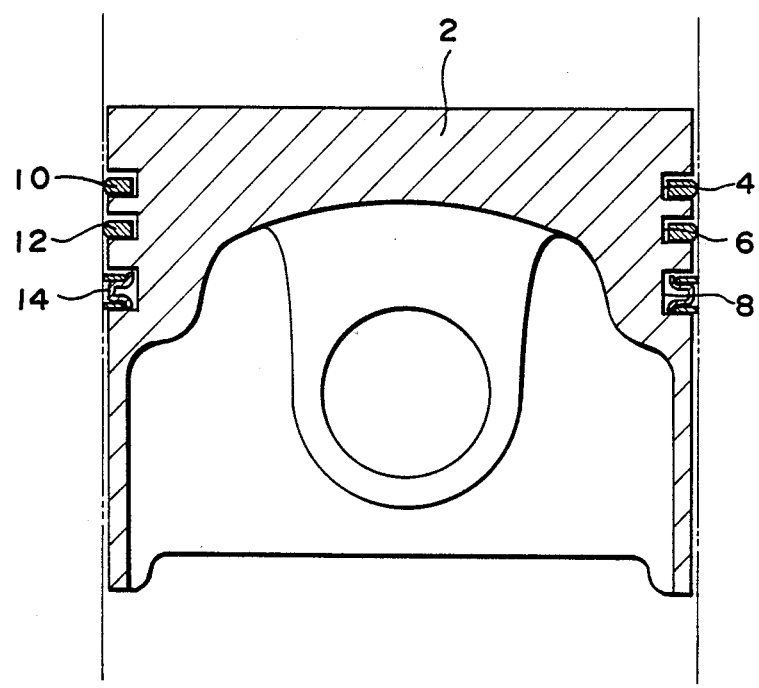
FIG. 3 is a cross-sectional view of an entire piston and piston-ring assembly in accordance with the first embodiment of the present invention and applicable to the second embodiment of the present invention.

FIG. 3 illustrates a piston and piston ring assembly for an internal combustion engine. As shown in FIG. 3, a piston 2 includes at least one piston-ring groove, for example, two piston-ring grooves 4 and 6 and an oil-ring groove 8 located below piston-ring grooves 4 and 6. Piston-rings 10 and 12 are loosely fitted in piston-ring grooves 4 and 6, respectively, and oil-ring 14 is loosely fitted in oil-ring groove 8. Piston-ring grooves 4 and 6 and oil-ring groove 14 circumferentially extend over an entire circumference of piston 2. When piston 2 is orientated in a vertical direction, as shown, the piston-ring groove located at an uppermost position is a top piston-ring groove 4; the piston-ring groove located at a second uppermost position is a second piston-ring groove 6; and piston-ring grooves located at third, fourth, . . . uppermost positions, respectively, (not shown) are third, fourth, . . . piston-ring grooves, respectively. Similarly, the piston-ring fitted in top piston-ring groove 4 is a top piston-ring 10; the piston-ring fitted in second piston-ring groove 6 is a second piston-ring 12; and piston-rings fitted in the third, fourth, . . . piston-ring grooves (not shown) are third, fourth, . . . piston-rings, respectively.

Figure 1A:
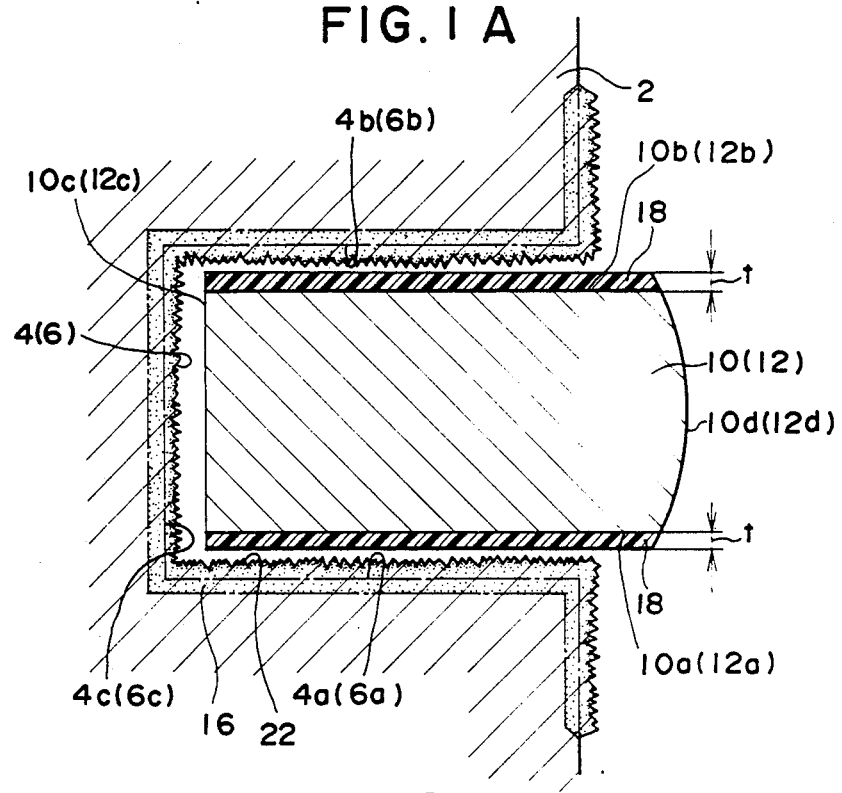
FIG. 1A is a cross-sectional view of a portion of a piston including a piston-ring groove and a piston-ring fitted in the piston-ring groove in accordance with a first embodiment of the present invention.

As shown in FIGS. 1A and 1B, each piston-ring groove 4, 6 includes a groove lower surface 4a, 6a, respectively; a groove upper surface 4b, 6b, respectively; and a groove side surface 4c, 6c, respectively. Groove side surface 4c connects groove upper and lower surfaces 4b and 4a; and groove side surface 6c connects groove upper and lower surfaces 6b and 6a. Similarly, each piston-ring 10, 12 includes a ring lower surface 10a, 12a, respectively; a ring upper surface 10b, 12b, respectively; a radially inside ring side surface 10c, 10d, respectively; and a radially outside ring side surface 10d, 12d, respectively.

Piston 2 receives the heat flux from the combustion chamber of the engine at a top surface of piston 2 defining the combustion chamber thereabove. The heat flux then flows to a cylinder of the engine via piston-rings 10 and 12 and oil-ring 14. Most of the heat flux flows to the cylinder via top piston-ring 10. Thus, a portion of piston 2 close to top piston-ring 10 is severely heated, for example, up to the temperature of 200°–300° C. Groove lower surface 4a of top piston-ring groove 4 is heated up to the temperature of no less than 200° C. Groove lower surface 4a of top piston-ring groove 4 receives the severest load because top piston-ring 10 is pushed against groove lower surface 4a of top piston-ring groove 4 when the combustion pressure of the engine acts on top piston-ring 10.

Piston 2 comprises aluminum base alloy. If no surface treatment was applied to the piston, the aluminum base alloy of the piston would be softened when the piston is heated up to the temperature of 200°–230° C., and the softened aluminum alloy of the piston would agglutinate to the top piston-ring. As shown in FIGS. 1A and 1B, for the purpose of suppressing such agglutination, such a kind of surface hardening treatment as is accompanied by an increase in surface roughness is applied to the groove surface of the piston-ring groove in the present invention. More particularly, the surface treatment is applied to at least groove lower surface 4a of at least top piston-ring groove 4.

The reason why the surface hardening treatment should be applied to at least top piston-ring groove 4 is that top piston-ring groove 4 is exposed to the severest thermal conditions. When desired, the surface treatment may also be applied to the surfaces of second piston-ring groove 6 and other piston-ring grooves. The reason why the surface treatment should be applied to at least lower surface 4a of top piston-ring 4 is that lower surface 4a of top piston-ring 4 receives the severest load. When desired, the surface treatment may also be applied to groove upper surface 4a, 6a and/or groove side surface 4c, 6c of each piston-ring groove 4, 6 and groove lower surface 6a of second piston-ring groove 6. The surface treatment accompanied by an increase in surface roughness comprises, for example, alumite treatment. Alumite treatment itself is a known technique.

Figure 2A:
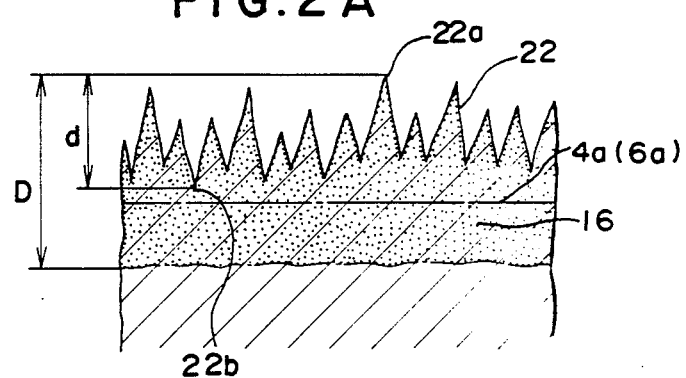
FIG. 2A is a partial, enlarged cross-sectional view of a surface of the piston-ring groove of FIG. 1A.

In the first embodiment of the present invention, as shown in FIGS. 1A and 2A, the surface hardening treatment accompanied by an increase in surface roughness comprises only alumite treatment. The alumite treatment will form a hardened layer 16 in a portion of piston 2 close to the groove surface. The outside surface of hardened layer 16 is located outside the original position of the groove surface in a direction perpendicular to the groove surface, and the inside boundary of hardened layer 16 is located inside the original position of the groove surface in the direction perpendicular to the groove surface. In the second embodiment of the present invention, as shown in FIGS. 1B and 2B, the surface hardening treatment accompanied by an increase in surface roughness comprises the alumite treatment for forming hardened layer 16 and ion plating of titanium nitride for forming a titanium nitride layer 20 on the outside surface of hardened layer 16.

When the alumite treatment is applied to the surface of piston-ring groove 4, 6, the groove surface is roughened to form a rugged surface 22 which defines the outside surface of hardened layer 16 (see FIG. 2A). Preferably, the roughness of rugged surface 22 is controlled so that a distance d between a top 22a and a bottom 22b of rugged surface 22 is 4–16 microns as measured in a direction perpendicular to the groove surface where the alumite treatment is applied. The roughness can be controlled by controlling the period of time that the piston is put in alumite treatment liquid. A portion of the piston-ring groove where no alumite treatment is desired to be applied is masked when the piston is put into the alumite treatment liquid. As shown in FIG. 2B, in the case of the second embodiment where titanium nitride layer 20 is formed on hardened layer 16, the outside surface 24 of titanium nitride layer 20 will be formed so as to have substantially the same roughness as that of rugged surface 22 of hardened layer 16 obtained through application of only the alumite treatment, because titanium nitride layer 20 tends to follow the contour of rugged surface 22 of hardened layer 16.

FIGS. 1A and 1B illustrate piston-ring groove 4, 6 and piston-ring 10, 12 located in the corresponding piston-ring groove 4, 6. When the surface treatment of piston-ring groove 4, 6 comprises alumite treatment, as shown in FIGS. 2A and 2B, the thickness D of hardened layer 16 formed in piston 2 through the application of the alumite treatment is preferably 10–20 microns as measured in a direction perpendicular to the portion of original groove surface to which the alumite treatment is applied. The reason why hardened layer 16 is preferred to be formed thicker than or equal to 10 microns is to assure a desirable life to the assembly because hardened layer 16 will be gradually worn during a long term operation of the engine, however hard the hardness of hardened layer 16 may be. The reason why hardened layer 16 is preferred to be thinner than or equal to 20 microns is that the thicker hardened layer 16 is, the more the distance d between top 22a and bottom 22b of the ruggedness comes to exceed the tolerable limit for the distance d. When top portions of rugged surface 22 are abraded, a clearance between the groove surface and the piston-ring gradually increases. If the clearance finally exceeds the tolerable limit for the clearance which corresponds to the tolerable limit of the distance d, the piston-ring will have an unstable movement in the piston-ring groove to cause an intolerable increase in blowby gas amount and oil consumption.

The alumite treatment is performed by masking a portion of the surface of the piston where the alumite treatment is not desired to be applied and putting the masked piston into the alumite treatment liquid comprising oxalic acid and sulfuric acid. The alumite treatment is controlled so that hardened layer 16 has a thickness of 10–20 microns as measured in the direction perpendicular to the surface. When the hardened layer 16 reaches the above-described thickness, the resulting roughness of the outside rugged surface of hardened layer 16 is 4–16 microns in distance d between top 22a and bottom 22b of rugged surface 22.

When the surface hardening treatment comprises alumite treatment, the hardness of hardened layer 16 is $H_k$ 300–450 in Knoop hardness. Since the hardness of aluminum base alloy itself is less than $H_k$ 200, it can be said that the portion of piston close to the groove surface is greatly hardened by the alumite treatment. Hardened layer 16 with the hardness of $H_k$ 300–450 can endure a temperature of 300° C. without being softened. Because the maximum temperature to which groove lower surface 4a of top piston-ring groove 4 may be exposed is less than 300° C., hardened layer 16 can endure the maximum temperature of less than 300° C. and effectively prevents agglutination of the aluminum base alloy to the piston-ring from happening.

As illustrated above, the surface of hardened layer 16 is a rugged surface. Therefore, if no countermeasure were taken, such a rugged surface would be accompanied by an increase in blowby gas amount and oil consumption. As a countermeasure for suppressing such an increase in blowby gas amount and oil consumption, in the present invention, as shown in FIGS. 1A and 1B, a coating layer 18 including resin with an excellent adhesive property as its base material is formed on the surface of piston-ring 10, 12 opposing rugged surface 22 of hardened layer 16 of the piston-groove in the first embodiment or rugged surface 24 of titanium nitride layer 20 of the piston-ring groove in the second embodiment. The resin with an excellent adhesive property means such a resin as is not exclusive of a foreign material and tends to well adhere to any kind of surface. Thus, tetrafluoroethylene that is exclusive of a foreign material as well as having a high lubricative property should not be included in that resin with an excellent adhesive property.

The resin with an excellent adhesive property includes, for example, polyamide resin, and polyimide resin. The tolerable temperature limit for use of polyamide resin and polyimide resin is in the range of 170° C.–360° C. By selecting one of polyamide resin and polyimide resin as the material of coating layer 18, coating layer 18 can endure the temperature to which the piston-ring is exposed. Also, polyamide resin and polyimide resin can give the piston-ring a good lubricative property in axial and circumferential movements of the piston-ring relative to the piston-ring groove.

Coating layer 18 may include in its material at least one kind of material selected from the group of molybdenum disulfide ($MoS_2$), graphite (C) and ferrite type dioxide. These materials function so as to increase heat resistive property of coating layer 18 including the resin with an excellent adhesive property. In the case where coating layer 18 includes graphite, the lubricative property of coating layer 18 will be further improved.

The thickness t of coating layer 18 is preferably 3–13 microns. The lower limit of 3 microns is determined from the volume of resin necessary to fill the valleys of rugged groove surface 22, 24 of the piston-ring groove when one portion of coating layer 18 is removed from the piston-ring during the operation of the engine and moves to and adheres to the surface of the piston-ring groove to gradually fill the valleys of rugged groove surface 22, 24. More particularly, filling the valleys of rugged surface 22, 24 is performed in the following two manners. One is that one portion of the resin of coating layer 18 is removed from the piston-ring firstly through abrasion of coating layer 18 by rugged surface 22 of hardened layer 16 in the first embodiment or rugged surface 24 of titanium nitride layer 20 in the second embodiment, and then the resin adheres to rugged surface 22, 24, and when the resin having adhered to rugged surface 22, 24 is pushed against rugged surface 22, 24 by the piston-ring to be deformed so as to fill the valleys of rugged surface 22, 24. The other is that when the piston-ring is strongly pushed against rugged surface 22, 24, the top portions of rugged groove surface 22, 24 of the piston-ring groove invade into coating layer 18 so that the resin of coating layer 18 is deformed to invade into and fill the valleys of rugged surface 22, 24 of the piston-ring groove and strongly adheres to rugged surface 22, 24, and when the adhesive strength acting between the resin and rugged surface 22, 24 is greater than the adhesive strength acting between the resin and the piston-ring, the resin remains on the side of rugged surface 22, 24 and fills the valleys of rugged surface 22, 24. Because of this filling of the valleys of rugged surface 22, 24 of the piston-ring groove, the amount of air and oil passing through the valleys of rugged surface 22, 24 of the piston-ring groove is greatly suppressed. On the other hand, the upper limit of 13 microns is determined from the thickness of coating layer 18 necessary to prevent unstable movement of the piston-ring in the piston-ring groove from happening, even when the entire portion of coating layer 18 is removed from the piston-ring. Too much free movement of piston-ring 10, 12 in piston-ring groove 4, 6 would cause an intolerable increase in blowby gas amount and oil consumption.

Figure 4:
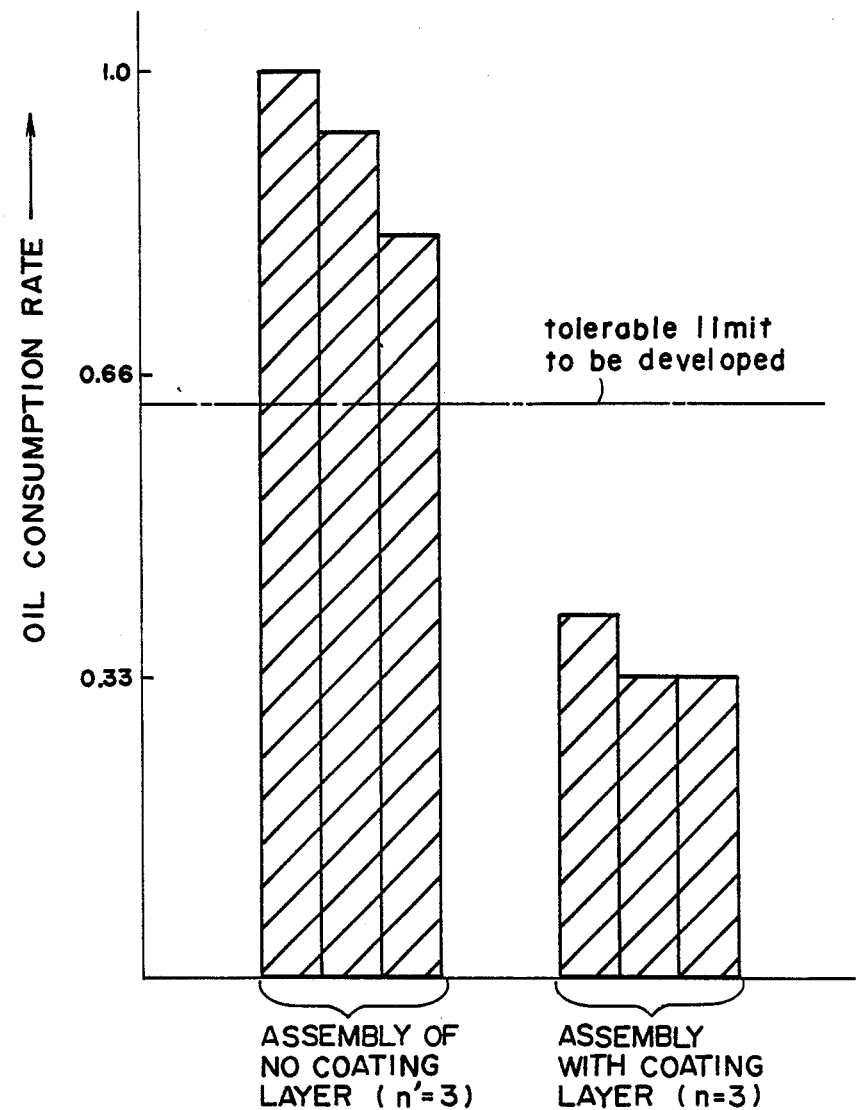
FIG. 4 is a diagram illustrating results of oil consumption tests that were performed with respect to three assemblies in accordance with the present invention and three assemblies without coating layers for comparison.

To confirm the effects of coating layer 18 for suppressing an increase in blowby gas amount and oil consumption, tests were performed using three examples (n=3) of the piston and piston-ring assemblies in accordance with the present invention, each having coating layer 18, and three examples (n'=3) of the prior art piston and piston-ring assemblies having no coating layer. The tests were performed under the same test conditions, that is, using the same engine and under the same intake pressure and the same period of time, with respect to the assemblies in accordance with the present invention and the prior art assemblies. Each of the assemblies in accordance with the present invention included a piston where alumite treatment was applied to the groove surface of the top piston-ring groove and piston-rings including a top piston-ring on which the resin with an excellent adhesive property including molibdenum disulfide and graphite therein was coated; and each of the prior art assemblies included a piston where alumite treatment was applied to the groove surface of the top piston-ring groove and piston-rings on which no resin layer was formed. In FIG. 4, the test results are shown in the form of a rate of oil consumption where the greatest oil consumption rate is taken 1.0. As will be apparent from FIG. 4, the oil consumption in the case of the assemblies in accordance with the present invention was suppressed to about one third of the oil consumption in the case of the prior art assemblies. Blowby gas amount was thought to be also decreased by substantially the same rate as the rate of decrease in oil consumption.

According to the present invention, the following effects are obtained.

Firstly, because the surface hardening treatment accompanied by an increase in surface roughness is applied to at least lower groove surface 4a of at least top piston-ring groove 4, and preferably also surface 6a of groove 6, the heat resistive property of the piston and piston-ring assembly was greatly and sufficiently increased. The surface hardening effectively prevents agglutination of the aluminum base alloy of piston 2 to the piston-ring so that sticking of the piston-ring to the groove surface of the piston-ring groove is prevented.

Secondly, in spite of an increase in roughness of the piston-ring groove surface because of the application of the surface hardening treatment to the groove surface of the piston-ring groove, because coating layer 18 of resin with an excellent adhesive property is formed on at least the portion of the surface of piston-rings 10, 12 opposing hardened layer 16 of piston-ring grooves 4, 6, the valleys of rugged surface 22, 24 of hardened layer 16 are filled with the resin which adheres to rugged surface 22, 24 so that an increase in blowby gas amount and oil consumption is effectively suppressed.

Thirdly, as a combined effect of the above-described two effects, the heat resistive property of the piston and piston-ring assembly of the present invention is greatly improved without being accompanied by an increase in blowby gas amount and oil consumption.

Although only a few preferred embodiments of the present invention have been described in detail, it will be appreciated by those skilled in the art that various modifications and alterations can be made o the particular embodiments shown without materially departing from the novel teachings and advantages of the invention. Accordingly, it is to be understood that all such modifications and alterations are included in the scope and spirit of the invention as defined by the following claims.

What is claimed is:

1. A piston and piston-ring assembly for an internal combustion engine, comprising:
   a piston comprising aluminum base alloy, the piston being formed with piston-ring grooves, each of the piston-ring grooves being defined by a groove surface including a groove upper surface, a groove lower surface and a groove side surface connecting the groove upper and lower surfaces when the piston is vertically orientated, such a kind of surface hardening treatment as is accompanied by an increase in surface roughness being applied to at least a groove lower surface of at least a top piston-ring groove; and piston-rings located in the piston-ring grooves, each of the piston-rings including a ring upper surface, a ring lower surface ad a radially inside ring side surface opposing the groove upper surface, the groove lower surface, and the groove side surface of a corresponding piston-ring groove, respectively, when the piston is vertically orientated, at least a surface of a piston ring opposing the hardened surface of the piston-ring groove being formed with a coating layer including resin with an excellent adhesive property as a base material of the coating layer.

2. The piston and piston-ring assembly according to claim 1, wherein the surface hardening treatment accompanied by an increase in surface roughness comprises alumite treatment.

3. The piston and piston-ring assembly according to claim 1, wherein the resin with an excellent adhesive property comprises polyamide resin.

4. The piston and piston-ring assembly according to claim 1, wherein the resin with an excellent adhesive property comprises polyimide resin.

5. The piston and piston-ring assembly according to claim 1, wherein the coating layer further includes at least one kind of material selected from the group consisting of molybdenum disulfide, graphite, and ferrite type dioxide.

6. The piston and piston-ring assembly according to claim 1, wherein the thickness of a hardened layer formed in a portion of the piston close to the groove surface to which the surface hardening treatment is applied is 10–20 microns in a direction perpendicular to the groove surface.

7. The piston and piston-ring assembly according to claim 6, wherein the roughness of a rugged outside surface of the hardened layer is 4–16 microns in distance between a peak and a valley of the rugged surface as measured in a direction perpendicular to the groove surface portion to which the surface hardening treatment is applied.

8. The piston and piston-ring assembly according to claim 6, wherein the hardness of the hardened layer is 300–450 in Knoop hardness.

9. The piston and piston-ring assembly according to claim 1, wherein the thickness of the coating layer is 3–13 microns.

10. The piston and piston-ring assembly according to claim 6, wherein a titanium nitride layer is further formed on the hardened layer through ion plating.

* * * * *

UNITED STATES PATENT AND TRADEMARK OFFICE
CERTIFICATE OF CORRECTION

PATENT NO. : 4,899,702
DATED : February 13, 1990
INVENTOR(S) : N. Sasaki, et al.

It is certified that error appears in the above-identified patent and that said Letters Patent is hereby corrected as shown below:

Column 3, line 29, change "well adheres" to --adheres well--; and
line 32, change "well adhere" to --adhere well--.

Column 6, line 55, change "well adhere" to --adhere well--.

Column 7, line 6, insert --the-- between "increase" and "heat".

Column 7, line 11, change "thickness t" to --thickness $\underline{t}$--.

Column 8, line 50, change "o" to --to--.

Column 9, line 5, change "ad" to --and--.

Signed and Sealed this

Ninth Day of July, 1991

Attest:

HARRY F. MANBECK, JR.

*Attesting Officer*    *Commissioner of Patents and Trademarks*